United States Patent

Mueller et al.

[11] 4,055,673
[45] Oct. 25, 1977

[54] METHOD OF MOISTENING WHOLE GRAINS

[75] Inventors: Roman Mueller, Niederuzwil, Switzerland; Josef Kalapos, Mommenheim, Germany

[73] Assignee: Gebrueder Buehler AG, Uzwil, Switzerland

[21] Appl. No.: 649,100

[22] Filed: Jan. 14, 1976

Related U.S. Application Data

[62] Division of Ser. No. 547,357, Feb. 5, 1975, abandoned.

[30] Foreign Application Priority Data

Feb. 8, 1974 Switzerland .................. 1757/74
Oct. 2, 1974 Switzerland .................. 13240/74
Nov. 22, 1974 Switzerland .................. 15610/74

[51] Int. Cl.² .................. A23L 1/212; A23P 1/00
[52] U.S. Cl. .................. 426/231; 99/519;
366/152; 366/603; 416/198 R; 426/507;
426/519
[58] Field of Search .......... 426/507, 462, 511, 461,
426/506, 463, 519, 231, 510, 467, 459, 455;
259/7, 9, 10, DIG. 31; 99/516, 536, 519;
416/198 R, 200 R, 204 R, 200 A, 213 R, 198 A,
213 A

[56] References Cited

U.S. PATENT DOCUMENTS

| 720,122 | 2/1903 | Espey | 426/461 X |
|---|---|---|---|
| 1,239,396 | 9/1917 | Hunt | 426/462 |
| 1,679,099 | 7/1928 | Smith | 426/507 |
| 1,725,279 | 8/1929 | Kantmann | 259/10 |
| 1,914,459 | 6/1933 | Reider et al. | 259/9 |
| 1,920,107 | 7/1933 | Richardson | 426/461 |
| 3,222,183 | 12/1965 | Rozsa et al. | 426/462 X |
| 3,528,815 | 9/1970 | Trotter | 426/510 X |
| 3,700,468 | 10/1972 | Shore et al. | 426/507 X |
| 3,734,471 | 5/1973 | Engels | 259/10 X |

*Primary Examiner*—S. Leon Bashore
*Assistant Examiner*—Kenneth M. Schor
*Attorney, Agent, or Firm*—Merchant, Gould, Smith, Edell, Welter & Schmidt

[57] ABSTRACT

Whole grain kernels are admitted through an inlet at one end of a closed tubular vessel, and are entrained by a blade-type rotor in the presence of metered quantities of liquid, being accelerated so that they form in the vessel a whirling tubular veil which continuously travels lengthwise of the vessel towards an outlet thereof and wherein each kernel becomes uniformly wetted over its entire surface and moistened to a predetermined value.

13 Claims, 10 Drawing Figures

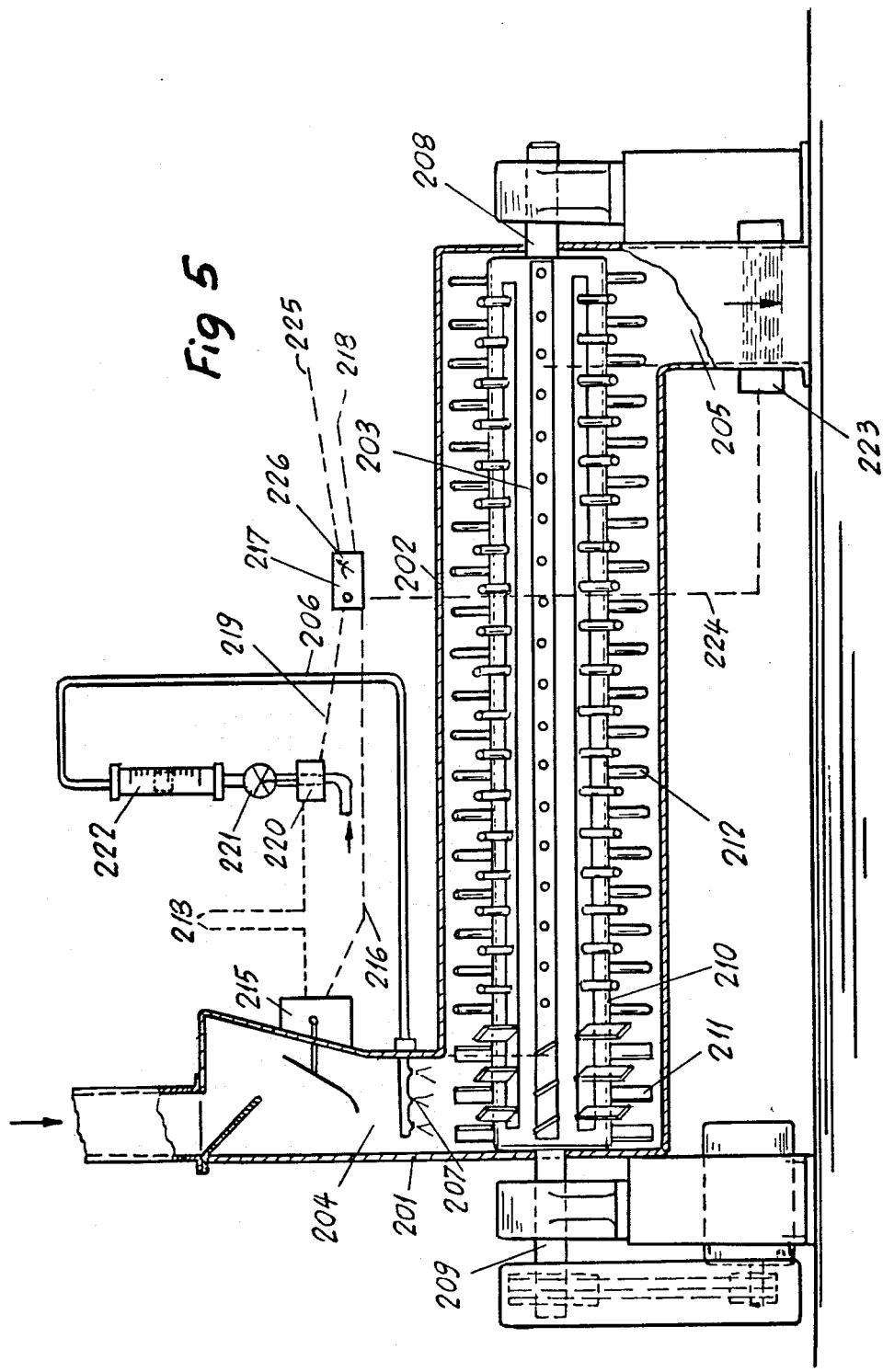

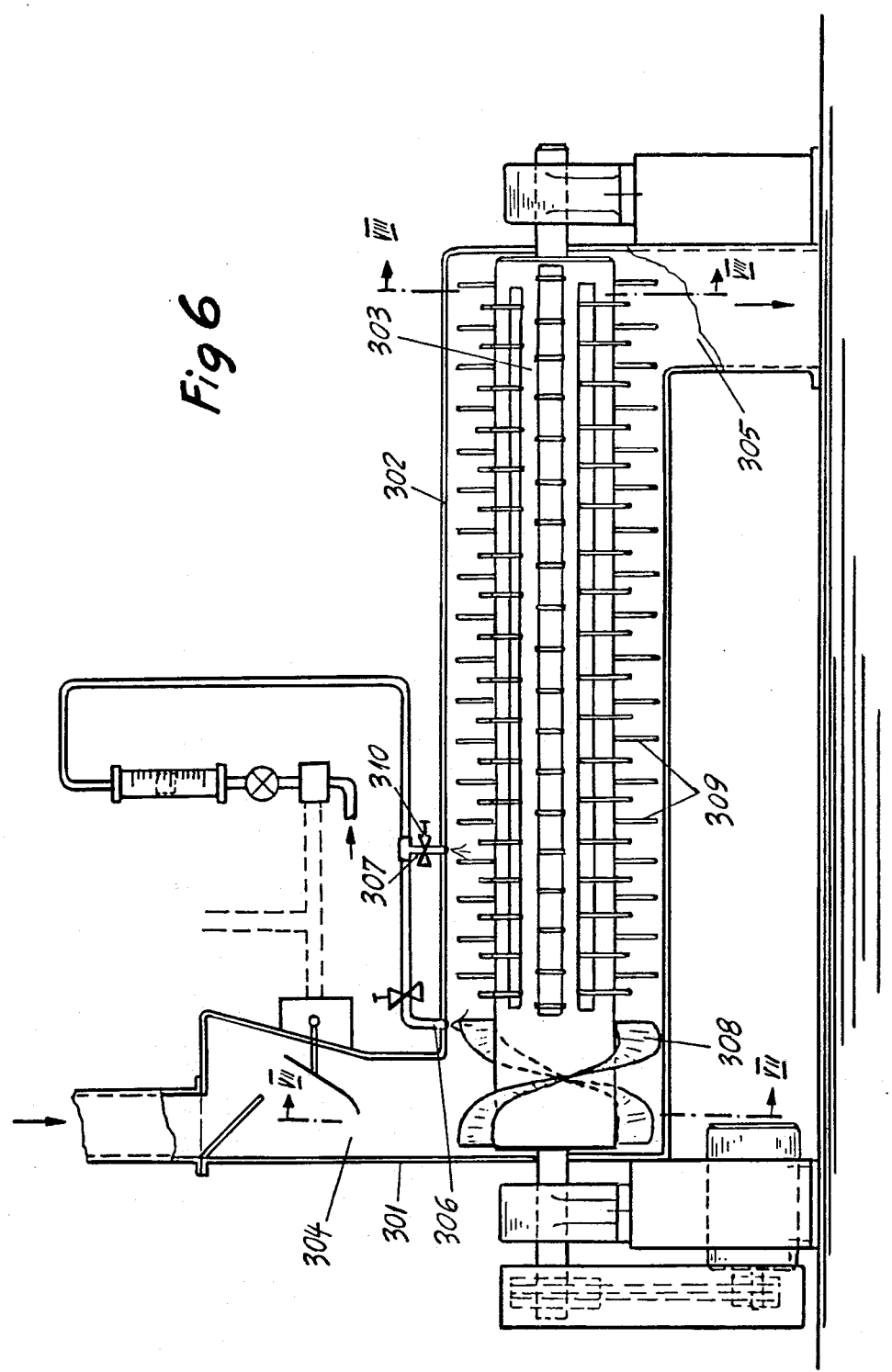

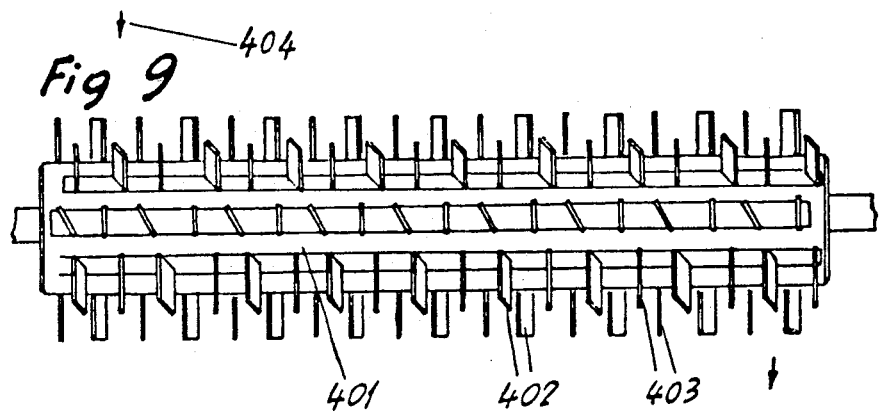
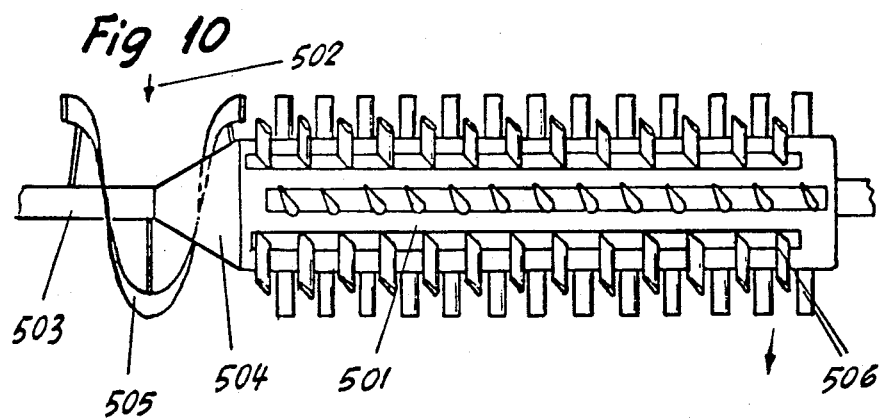
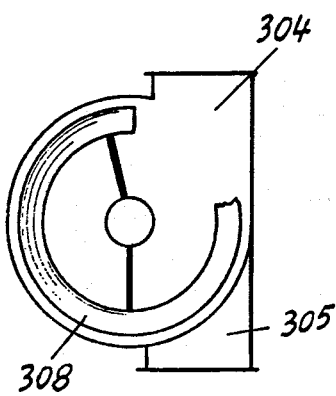
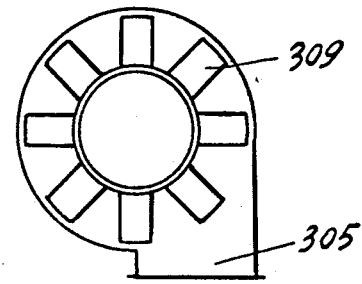

METHOD OF MOISTENING WHOLE GRAINS

This is a division, of application Ser. No. 547,357, filed Feb. 5, 1975, now abandoned.

BACKGROUND OF THE INVENTION

This invention relates to the moistening of whole grains, more particularly to a novel method of effecting such moistening and to an apparatus for carrying out the method.

The invention is applicable to whole grains of all types, and is especially advantageous when used in conjunction with whole cereal grains, such as for example wheat, barley, oats, millet, rice and the like.

Cereal grains find their largest use as flour. Before they can undergo conversion into flour in a flour mill they must be subjected to several preliminary processing operations, since they cannot be supplied to the flour mill in the condition in which they are harvested. The most important of these preliminary operations is the cleaning of the grains. This is carried out in the prior art in one of two ways: The cereal grains, and to be more specific the kernels of cereal grain, are either washed in special washing machines provided for this purpose or they are washed in so-called wet scrubbers. If the grains are washed in washing machines they will, at the end of the washing operation, have a moisture content that is increased by between 2 and 3% over the moisture content prior to the washing operation. If they are cleaned in a wet scrubber, then the moisture content increase will be between 1 and 1.5%. It will be appreciated that in neither case it is possible to predetermine the exact amount of moisture increase in the kernels.

This is found highly disadvantageous because flour milling requires that the kernels being ground have a specified moisture content which is allowed to vary only within very narrow limits. This moisture content is higher than that which can be imparted by either of the two washing methods, and therefore the kernels have water added to them subsequent to the washing operation. Particularly in the case of grain which has been cleaned according to still a third method, namely the dry cleaning method which does not involve the use of water, the moisture content of the cereal must often be increased by 5-6%. This adjusting of the moisture content is of great importance in the milling industry, because the moisture content of the grain strongly influences the subsequent operations, such as grinding, sifting and the like.

The moisture content must, however, not only be increased to a certain value, but it must also be as uniform as possible. According to the prior art it is known to admit a stream of the grain kernels into a trough in which a slowly rotating conveyor screw or blade-conveyor screw is mounted, and into which water is admitted, so that the grain kernels are carefully and uniformly turned over in the water. Subsequently, the wetted grain kernels are admitted into a receptacle in which they are allowed to sit for a prolonged period of time, the intention being that the water which adheres to the surface of the kernels is to penetrate into their interior to thus soften the kernels and in particular the outer coat of the kernels which hopefully should become somewhat elastic.

Different types of grains react differently to this prior-art moistening. For example, certain types of grain kernels, such as wheat, have a pronounced depression in their exterior surface, whereas others — such as rice and millet — do not have such a depression. The surface area in which the depression is formed, amounts to a significant percentage of the total surface area of the particular kernel. It was found that during the initial wetting operation in the prior art the wetting liquid would enter into such depressions only to a limited extent, and that the area of the germ of the particular kernel also became wetted only to a limited extent. In part this was made up by the subsequent soaking, that is the penetration of the liquid into the kernels when the latter were allowed to rest after the wetting operation. However, uniformity of wetting and soaking could never be achieved. This is known in the industry to be highly disadvantageous; for example, it is well known that a non-uniform wetting of the kernels of one and the same types of wheat is very disadvantageous for subsequent operations, and that it is of course more disadvantageous if a mixture of different types of grains is non-uniformly wetted and moistened.

SUMMARY OF THE INVENTION

Accordingly, it is an object of the present invention to overcome the disadvantages of the prior art.

More particularly, it is an object of the present invention to provide an improved method of uniformly wetting and moistening whole grains, particularly — but non exclusively — whole cereal grains.

Another object of the invention is to provide an apparatus for carrying out the method.

In keeping with these objects, and with others which will become apparent hereafter, one feature of the invention resides in a method of moistening whole grains, particularly whole cereal grains, which comprises the steps of admitting grain kernels through an inlet at one end of a closed vessel, and entraining the admitted grain kernels in the presence of metered quantities of liquid, and accelerating them to form a whirling tubular vail which continuously travels lengthwise of the vessel towards an outlet thereof and wherein each kernel becomes uniformly wetted over its entire surface and moistened to a predetermined value.

It was found, surprisingly, that the briefly outlined novel method overcomes the prior-art moistening and wetting difficulties for grains, especially grains wherein the respective kernel is formed with a depression, such as wheat. It was also found that particularly where wheat is being treated according to the present method, the area of the wheat germ and all other irregular surface portions of the particular kernel were uniformly wetted with the treating liquid.

In particular, relating the invention by way of example to the wetting of wheat kernels, it was found that in a single step the present invention permits wetting of a surface area which is greater by 20-25% than the surface area that could be wetted with the prior art. In orther words, 20-25% more surface area of a particular wheat kernal will become wetted in accordance with the present invention than was possible in the prior art. This, however, is not the only advantageous feature of the invention. It was found, and came as a very substantial surprise even to the specialists in the field, that by resorting to the present invention a portion of the wetting liquid will penetrate into the interior of the kernel through the narrowest area of the depression in the exterior of the kernel. In the grain-processing industry it is conventional to use coloring methods and dye methods to trace the distribution of wetting liquid; utilizing such dye methods and comparing the wetting liquid distribution obtained according to the present method with the same distribution obtained according to the prior art, we found that immediately after wetting grain in accordance with the present method a complete uniformity of the distribution of the wetting liquid over the surface of each grain kernel existed; this was particularly pronounced with respect to the depression in kernels (if they were of the type having such depression) and with respect to the term area, where the prior art showed little if any wetting.

The invention is of considerable importance in the manufacturing of flour, because most of the problems encountered in milling of grains to produce flour resulted from the fact that it was not heretofore possible to wet the germ area and the depression area with the same intensity as the remainder of the particular kernel, and thus to prepare the kernel uniformly for the subsequent milling and sifting. It was quite simply not possible, in the prior art, to direct the wetting liquid into the depression and to the germ area of the particular kernel in such a manner as to obtain in these regions a degree of wetting that was as good as on other surface portions of the kernel. It would appear that this was due to the substantial concavity or convexity of the areas in question.

The importance of the present invention for the grain-processing industry results not only from the elimination of problems which arose from the non-uniform wetting of the kernels; rather, there is a strong tendency in milling industry circles to believe that uniformly wetted grain kernels will produce a flour having superior baking characteristics, just as the flour produced from grain kernels which were wetted according to the prior art is considered to be superior to the flour produced from grain kernels which were merely dry cleaned to remove chaff and the like from them. In fact, a test series conducted in the industry appears to support this belief.

We have also found that the moistening of grain kernels to a predetermined value is not the only factor which controls the baking characteristics of flour subsequently produced from these grain kernels. We have identified a further factor, heretofore unknown, which also has a significant influence on the baking characteristics of the flour, namely the manner in which the moisture is admitted to the kernels, i.e. the manner in which the kernels are wetted. Quite surprisingly we have found that if a stream of grain kernels which has previously been subjected to a dye-type cleaning has sprayed into it as least 0.1% and up to about 1% of water or steam, and if the thus-wetted stream of grain kernels is thereupon accelerated to a high rotary speed in a closed tubular vessel and subjected to intensive impacting and frictional contact, the flour subsequently produced from such grain kernels will have superior baking characteristics. The impacting and abrading of the coats or shells of the grain kernels produce a "massage effect" upon the shells, causing them to become more readily friable but not resulting in breaking-apart of the kernels. Thus, the present invention makes it possible to take grain kernels which were subjected to a dye-type cleaning operation and by the admission of water or steam and subsequent further treatment of the thus-moistened kernels to bring these kernels to a condition in which the flour subsequently produced from them will have the same advantageous baking characteristics as flour produced from wet-cleaned kernels.

The present invention can be carried out independently of the cleaning of the kernels, both in time and in space.

According to a particularly advantageous aspect of the invention a stream of cleaned grain kernels has admitted into it a predetermined amount of water or steam, between substantially 0.1% and 5% or even more, and is then accelerated and entrained in a tubular housing to form a veil of kernels which travels at a high rotary speed, preferably at an circumferential velocity of 5–30m/sec. A rotor located in the housing and provided with a large number of impact blades is rotated relative to this tubular vail in order to impact the individual kernels and also to cause them to impact one another to thereby obtain friction between them, and with the further purpose of having the admitted liquid or steam be distributed uniformly to and on all of the kernels and to have it act uniformly upon them. This makes it possible to uniformly wet the kernels with a larger amount of liquid and in a shorter time, and thus also in a shorter path that is being traversed by the kernels.

The metering of the water or steam being admitted can be controlled in different ways. According to a first concept of the invention samples of the kernels to be processed are tested from time to time for their moisture. The amount of water required to be admitted to obtain the desired moisture content is calculated per unit weight, and the apparatus is then adjusted accordingly, that is the throughput of kernels per unit of time and the admission of water per unit of time is adjusted. Up to 5% of water can be admitted to the kernels during a single pass through the apparatus of the invention. Assuming that the throughput of kernels per unit of time and the amount of water admitted per unit of time are maintained constant, it is thus possible to obtain the admission of a quantity of water which can be maintained constant within accuracy of one-tenth of 1% deviation. The moisture of the kernels can be increased in a single pass through the machine by an amount that can be selected to be between 0.1 and 5% by weight. Even when the highest amount of moisture increase is selected, the admitted water is uniformly distributed to all kernels, particularly over the entire surface area of each kernel. It is particularly advantageous if the water is admitted in the region of the inlet to the machine, that is where the grain kernels are admitted. A test conducted with a machine in which the distance from the kernel inlet to the kernel outlet amounted to 2 meters, showed that over this distance it was possible to increase the moisture of the grain kernels by 5% by weight.

The water admission can also be controlled in another manner, namely by measuring the effective moisture of the kernels continuously either at the beginning of the moistening or wetting operation, or else at the end thereof. Since the present invention assures a uniform distribution of the water to all kernels and to all portions thereof, the moisture values can be directly measured. The wetting water which is on the surface of the kernels, and the moisture which already has penetrated to the interior of the kernels, can be added by appropriate calculations which are readily evident to those conversant with this art. The very rapid passage of the kernels through the machine does not mean that fluctuations resulting from a non-uniform starting moisture of the grain, non-uniformity of the grain passage per unit time, or other factors, need have a disadvantageous influence upon the final moisture content. Instead, a regulating arrangement which may for example control the admission of water, can immediately compensate for such fluctuations so that the present invention makes it possible to come very close to the ideal goal of obtaining an absolutely uniform wetting and moistening of all the kernels of a particular batch of grain being processed.

The moistening operation according to the present invention can be carried out immediately above the soaking tanks where the grain is allowed to rest for a period of time to permit the surface moisture to soak into it. In fact, if circumstances permit it the arrangement may be such that the wetted grain will be discharged by gravity into the soaking tanks without requiring horizontal transportation from the apparatus of the present invention into the soaking tanks. Due to the high-speed operation of the apparatus of the present invention the apparatus will become completely emptied upon termination of the supply of new grains, so that no residues leading to the growth of bacteria can remain in the apparatus.

It will be appreciated that every wetting operation is governed by certain physical loss, that is the molecular surface tension of water, the droplet formation and the adhesion of water on the surface to be wetted. It is these conditions which in the prior art prevented the entry of water droplets into the depressions of grain kernels, such as wheat. Therefore, if an entry of water into such a depression is to be effectively possible, this can occur only if the water is uniformly distributed and spreads on the entire surface of the kernel so that it can enter into the depression in form of a film rather than as a droplet. This uniform distribution of the water film over the entire surface of the particular kernel is possible only by the present invention, and it is believed that this is the result of the high-speed whirling of the kernels which form the earlier-mentioned tubular weil, the strong centrifugal forces which act upon the kernels as well as upon the water droplets, and possibly other factors which are not yet entirely clear. It was found that particularly good results are obtained if the tubular housing of the apparatus according to the present invention has a relatively small inner diameter of about 300 millimeters, and if the rotor which rotates within this housing has a very larger number of blades.

In a test conducted to compare the baking characteristics of grains wetted according to the present invention with those of grains wetted according to the prior art, two identical test mixtures were utilized, each containing 15% of Manitoba wheat, 50% of hard inland wheat, 30% of soft wheat and 5% of rye grains. These mixtures correspond to a grain mixture that is widely used in the production of flour for commercial and household applications. One batch of the mixture was wetted in accordance with the present invention, and the other batch was wetting according to the prior art. Both mixtures were then ground to produce flour, and examination showed that the mixture that had been wetted according to the present invention produced a 63% yield of flour, which is somewhat better than the average, a flour ash which was better than that of the other batch by 0.02% and a flour color which was better than that of the other batch by between 0.4 and 0.8 points.

It was also found that the settling or soaking period for grains wetted according to the present invention could be substantially reduced as compared to those wetted in accordance with the prior art.

It will be appreciated that the wetting can be supervised — at least where it involves unknown grain mixtures, that is mixtures of unknown types of grains and is unknown percentages — by dyeing individual grain samples in order to determine and thereupon maintain the optimum wetting effect.

In conditions in which only exceptionally low bacterial values are permissible, the present invention makes it possible to provide a specific treatment of the kernels, especially of their depressed areas and their germ areas, by adding appropriate bacterial-growth inhibiting substances to the treating liquid.

The apparatus according to the present invention was conceived to carry out the novel method. It is a wetting or moistening apparatus. Apparatus of this type is used in many applications, that is prior to grinding and for other applications.

Grain kernels inherently have such a structure that moisture can penetrate only with great difficulties and in minute quantities directly through the surface of the shell into the interior body of the kernel. Such kernels have passages through which the water must slowly penetrate via the germ into the interior of the kernel. This is a safety arrangement that protects the seed against undesired effects of moisture. In industrial use, grains are wetted and are then allowed to rest in a soaking tank for several hours, and it is only at the end of a period of several hours that the wetting water has centered into the interior of the grain kernels.

The prior-art wetting apparatus have a housing, frequently a housing which is closed and has an upper cover, in which a conveyor screw is turnably mounted. Water is admitted either in form of water vapor or steam into the interior of the housing, and the conveyor screw turns over the kernels which are also admitted into the housing with the aim of wetting the kernels as uniformly as possible. These apparatus must, however, take into account the fact that the kernels must not be damaged, that is they must not be broken, and they also should not be abraded. The reason for this is that if wetted grain containing a significant amount of broken kernels is admitted into the soaking tank, a strong increase in the content of bacteria on parasites is observed after only a relatively short period of time, whereas this does not occur — or at least not to such a significant extent — if the kernels are whole.

For this reason the wetting of the whole grain kernels must be carried out in such a manner as to avoid damaging or breaking of the kernels. The prior-art wetting apparatus usually have one or more conveyor screws which turn over and mix the kernels with the wetting liquid and which on purpose are allowed to turn no faster than about 60-120 turns per minute. If the screws are allowed to turn faster than this, a significant percentage of the kernels will become broken with the disadvantageous consequences outlined above; in addition, the uniformity of wetting decreases if the screws turn at a faster rate.

Moreover, in the prior-art wetting apparatus, the degree of wetting of the kernels was dependent upon the length of the conveyor screw or screws along which the kernels travelled while being wetted. There is a direct proportionality between the percentage of moisture that can be added to the kernels and the length of the wetting screws; hence, it was frequently not possible to add as much moisture as desired to the kernels in one passage of the kernels through a wetting apparatus.

The problems of the prior art overcome with the apparatus according to the present invention which, according to one feature, may comprise a tubular vessel having an inlet and an outlet for grain kernels, a rotor mounted for rotation in said vessel and provided with a plurality of individual blades projecting transversely of the axis of rotation and having free outer ends, and admitting means for admitting metered quantities of liquid into contact with said grain kernels in the region of said inlet. The apparatus further comprises drive means for rotating the rotor at a speed requisite to impart to said outer ends of said blades an circumferencial velocity of between substantially 6 and 30m/sec. to thereby entrain and accelerate the grain admitted via said inlet, so as to obtain its moistening and uniform surface wetting as the grain travels in said vessel in form of a whirling tubular veil in direction towards said outlet. The velocity must be at least substantially 6m/sec. but no more than substantially 30m/sec.

The apparatus according to the present invention is not only very simple and very effective, but represents a complete departure from the prior-art concept of wetting grain kernels slowly and while turning them over via slowly rotating conveying screws. Instead, the apparatus according to the present invention obtains a rapid and very intensive wetting resulting primarily from the use of a closed tubular vessel, a large number of blades on the rotor, and an circumferencial velocity of the outer blade ends of between substantially 6 and 30m/sec. This high circumferencial velocity and the large number of blades rotating in the tubular vessel produces a tubular veil of grain kernels which constantly rotates in the vicinity of the inner surface of the vessel. By using a large number of individual blades which are spaced from one another, there is a similarly large number of interstices between the blades in which the individual kernels can perform significant movements, so that they can constantly move around and become impacted by the blades and also impact other kernels. The tubular vessel itself advantageously is stationary and the contact of the kernels making up the whirling tubular veil with the inner circumferential surface of the tubular vessel imparts a slight retarding action upon the kernels so that the veil and each individual kernel will rotate at an angular velocity which is different from that of the rotor and the outer ends of its blades. This means that each kernel receives impact from the blades with a high frequency. Since the kernels can move freely within the context of the whirling tubular veil of kernels, and since the veil moves at almost the same circumferencial velocity as the rotor and the inner surface of the tubular vessel is wet from the admitted water, the impacts which the kernels received from the individual blades do not shatter the kernels. On the other hand, the high speed at which the tubular veil rotates assures the desired uniform wetting of each kernel, that is the uniform distribution of the water over the entire surface area of each kernel.

The present invention has still other advantages beyond those outlined above, advantages which have come as a surprise even to specialists in this field. One of these is the fact which has been previously outlined already with respect to the novel method, namely the apparatus assures that water will enter even into the cleft or depression of individual kernels of grain, which was never heretofore accomplished with prior-art apparatus. Another advantage is that even a short apparatus according to the present invention, that is apparatus which offers only a short travel path from inlet to outlet, permits wetting of the kernels with between 3 and 5% by weight of water, especially if the water is admitted into the vessel in the region of the inlet for the grain. After the thus-wetted grain is subsequently ground and converted into flour, such flour has been found to have superior baking characteristics.

In many instances it has been found to be advantageous if the circumferencial velocity of the outer ends of the blades is between 12 and 30m/sec., and particularly if wheat is being wetted an optimum circumferencial velocity has been found to be between 20 and 25m/sec.

To obtain the best results, a large number of blades is required to be provided on the rotor; this assures uniformity of wetting of each individual kernel. The number of blades on the rotor should in no instance be fewer than 20 per square meter of inner wall surface of the circumferential wall of the tubular vessel. For most applications, 80 or more (but fewer than 300) blades per square meter of inner surface area of the circumferential wall of the tubular vessel, will provide excellent wetting results. However, the above-mentioned upper limit in the number of blades should not be considered to be prohibitive; it is dictated only by economic considerations, in that the apparatus will evidently become the more expensive, the more blades are provided. No other factors which would dictate an upper limit to the number of blades have as yet been identified.

The blades are advantageously mounted on elongated carriers which extend lengthwise of the rotor axis; and it is advantageous if the blades on these carriers which are angularly spaced about the rotor axis, are axially offset relative to one another, in such a manner that a blade on one carrier is axially offset with respect to the blades both on the circumferentially preceding and the circumferentially succeeding carrier. A rotor that is so constructed will have the blades arranged thereon in an essentially helical configuration.

Since a very large number of blades is used, it is sufficient if the blades are of substantially flat configuration. The blades all together produce and guide the whirling vail of kernels, and of course they keep impacting the kernels which is a concept that is in direct contradistinction to the prior art where all impects were desired to be avoided. In fact, controlled impacting of the kernels is typical for the present invention since it is believed to be a major factor in obtaining uniform wetting.

The arrangement whereby the blades on the individual carriers are offset axially with reference to one another, is not the only arrangement that is possible. It would of course be possible to arrange the blades in groups in radial planes relative to the axis of rotation, but the other arrangement is preferable, since if annular spaces exist between the blades, that is if annular spaces exist which extend all the way around the circumference of the rotor, it has been observed that a less controllable relative movement between the blades and the grain kernels will develop. In many instances this is of no importance, but it must nevertheless be taken into account.

Preferably, the blades are mounted on the rotor so as to project radially, but to be inclined axially in order to exert a feeding action upon the kernels, that is to cause them to move axially of the rotor. Of course, only some of the blades could be so arranged and others of the blades could extend simply normal to the axis of rotation, or again some others could be arranged to exert a retarding action upon the flow of the grain kernels, for example in the region of the outlet.

The rotor itself is preferably provided with a hollow shaft and the diameter of the shaft at the base of the blades advantageously amounts to between 20 and 50% of the inner diameter of the tubular housing of the vessel. The wetting itself takes place in an annular cross-section within the housing, and the relatively small housing cross-section assures in part the excellent wetting, as well as facilitating the cleaning of the interior of the housing.

As a rule, the inner circumferential surface of the housing should be impermeable and smooth, since the intensive treatment of the grain kernels is to be effected by the blades themselves, not by any action of the housing surface. This is particularly true in the currently preferred embodiment in which the housing itself is stationary and only the rotor turns. It has been found that while the optimum inner diameter of the housing for cereal grains appears to be approximately 300 millimeters, an inner diameter in the range of about 250 to about 600 millimeters is usable without any difficulty and will yield excellent results. The circumferential velocity must be maintained only slightly lower if the housing has a large inner diameter, since the impingement of the kernels against the smooth inner surface of the housing walls is of little consequence.

In order to eliminate or reduce as much as possible the chance that the kernels might become fractured as they enter through the inlet and leave through the outlet, it is advantageous if the inlet and the outlet are arranged tangentially and discharge or receive material in the same sense in which the rotor turns.

The manner in which the apparatus according to the present invention works affords the designer almost complete freedom in the arrangement of the rotor axis. It is currently preferred that the rotor axis extend horizontally or be slightly inclined upwardly or downwardly with reference to the horizontal. If the rotor axis is in fact inclined, then an outlet may be arranged at the lower end of the housing (which will of course also be inclined along with the axis) so that for cleaning purposes a cleaning fluid may be admitted at the opposite axial end and run out through this outlet.

The water metering arrangement advantageously communicates with the material inlet and a drip arrangement or an atomizing nozzle or the like may be utilized. It is essential, however, that the water with the steam be provided either in or immediately in the vicinity of the material inlet, it must not be arranged too far from the inlet of the material, because otherwise a non-uniform distribution of the water to the grain kernels may result which subsequently cannot be compensated for by the wetting treatment that takes place within the apparatus.

A sensing and control device may be provided to switch on and off the flow of water or steam. However, the quantity of water or steam to be admitted per unit time may be selected independently of the operation of this device and may also be remote controlled, if desired. Of course, rotor constructions other than those mentioned above can also be used, especially for special applications.

Many types of seeds and grains are particularly brittle and will break very readily, but must under all circumstances be maintained whole. For treating kernels of this type, which must of course nevertheless be wetted equally as well as other types, special constructions may be utilized in accordance with the present invention. In the region of the inlet for the kernels an accelerating screw may be arranged, or else some of the blades may be appropriately inclined to accelerate and feed the material lengthwise of the rotor. These blades may be substantially flat, but a particularly gentle handling of the kernels will be obtained if the blades have a round or oval cross-sectional configuration. If separate accelerating elements are used, one or more accelerating screws can be employed, or analogous devices be used.

According to a particularly advantageous embodiment all blades may be uniformly mounted to extend at an angle of approximately 50°–85° with respect to the longitudinal axis of the rotor. Some of the blades may, however, also be arranged to extend normal to this rotor axis, and these may alternate with other blades that may be inclined to the rotor axis at angles of between substantially 45° and 80°. If an accelerating screw is used, the rotor may be of reduced cross-section in the region where the accelerating screw is provided, and the latter may surround this reduced cross-sectional portion of the rotor.

In some instances it is advantageous if the inlet from the water metering device communicates with the first portion of the housing, that is the portion adjacent the inlet for the kernels, so that the water impinges upon the already accelerated stream of kernels. In some instances, at least one more water metering device may be provided, communicating with the housing in the region between the inlet and the outlet; the provision of such a second device is particularly advantageous if an additive is to be admitted in the water which is dispensed by this second device, since in this manner a more uniform distribution of the additive is assured.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawings.

BRIEF DESCRIPTION OF THE DRAWING

FIG. 5 is a view similar to FIG. 1, but illustrating a different embodiment of the invention;

FIG. 6 is a view similar to FIG. 1 also, illustrating a further embodiment of the invention;

FIG. 7 is a section taken on line VII—VII of FIG. 6;

FIG. 8 is a section taken on line VIII—VIII of FIG. 6;

FIG. 9 is a side view, illustrating a further embodiment of a rotor for use in an apparatus according to the present invention; and FIG. 10 is a view similar to FIG. 9, illustrating still a further embodiment of the invention.

DESCRIPTION OF THE PREFERRED EMBODIMENTS

Figure 1:
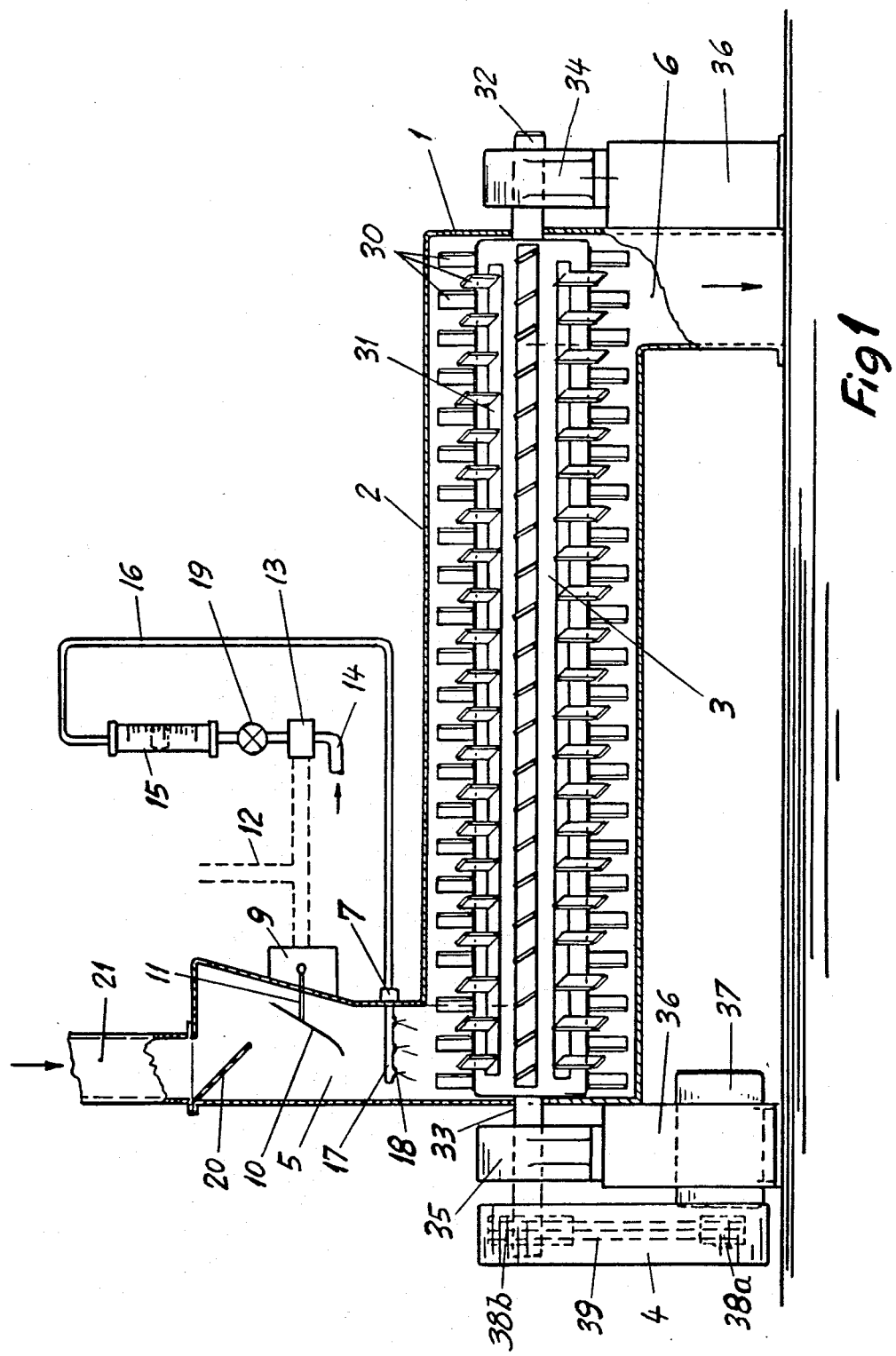
FIG. 1 is a side view of an apparatus according to the present invention, with the housing of the apparatus shown in a vertical section to illustrate the interior.
Figure 2:
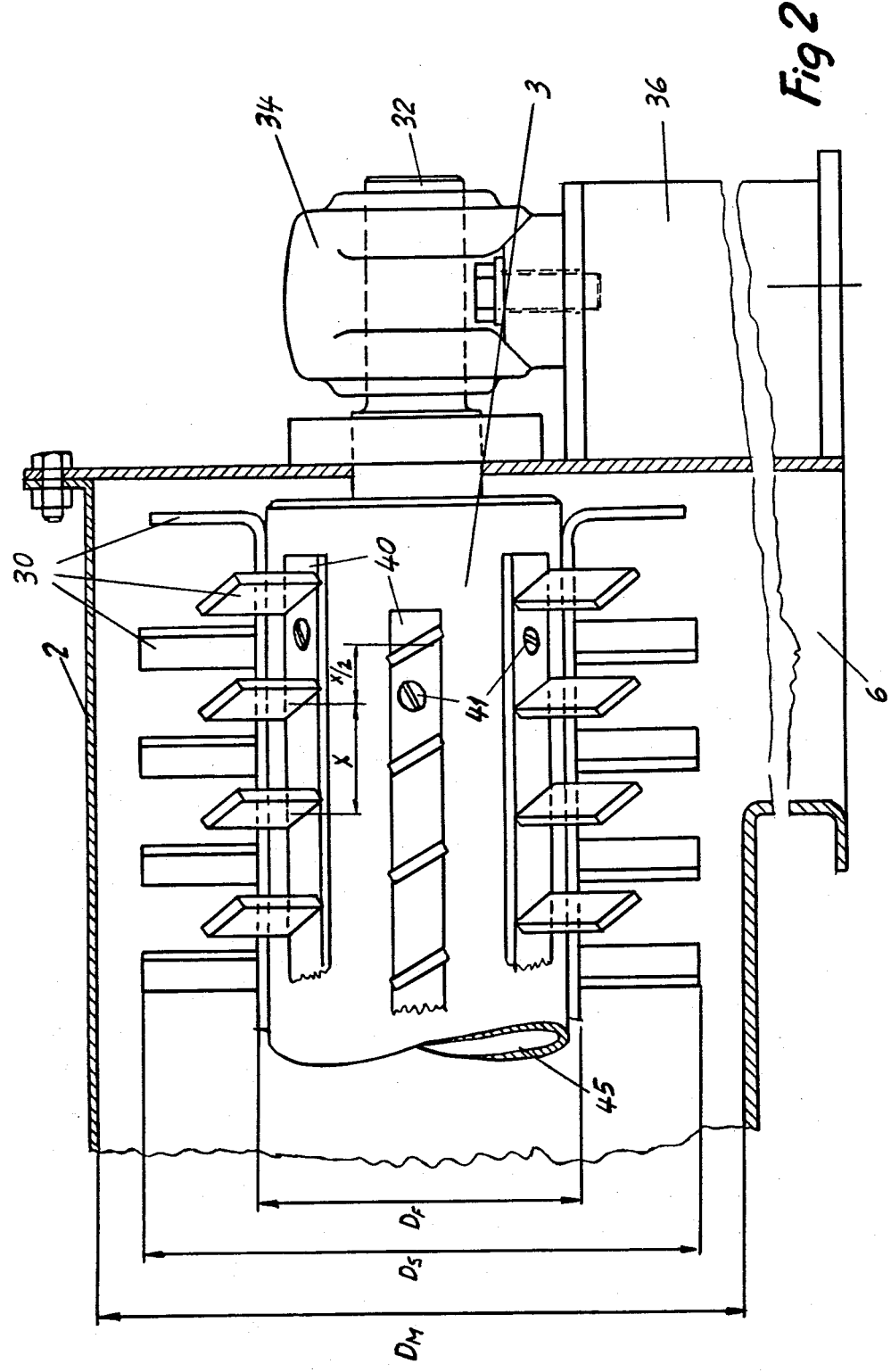
FIG. 2 is a fragmentary partly sectioned enlarged-scale detail view, illustrating the portion of the rotor of FIG. 1 in the region of the outlet of the housing.
Figure 3:
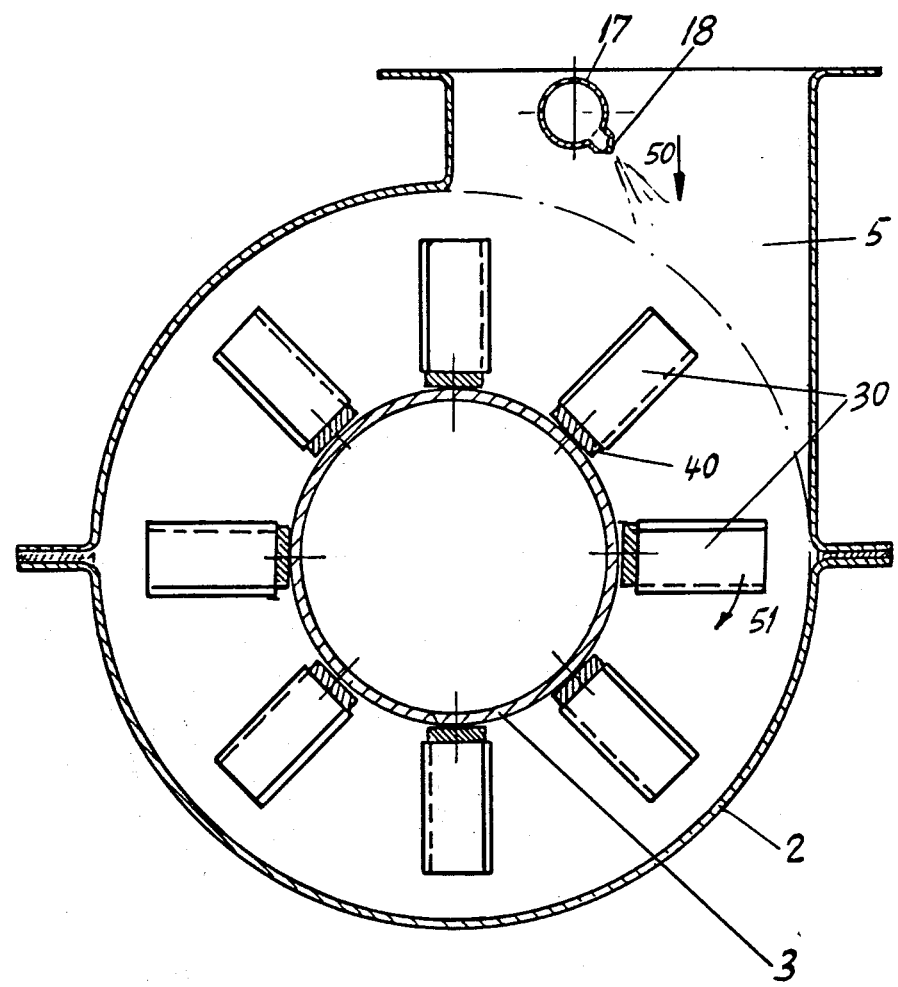
FIG. 3 is a somewhat diagrammatic cross-section through FIG. 1, in the region of the inlet to the housing.

FIGS. 1–3 illustrate a first embodiment of an apparatus according to the present invention. The apparatus has a housing 1, a tubular circumferential wall 2, a rotor 3 and drive means 4 for driving the rotor 3 in rotation. The left-hand end of the housing 1 is provided with an inlet 5 for grain kernels to be wetted, and the right-hand end of the housing 1 is provided with an outlet 6 for the wetted grain kernels. A water metering device 7 communicates with the housing 1 in the region of the inlet 5 which diverges in upward direction and has mounted on it a detecting device 9 which is known from the art and which detects the flow of material through the inlet 5. An inclined contact plate 10 is tiltably mounted on an arm 11 which is coupled with the device 9 so that tilting of the plate 10 when material drops onto it from above, causes the device 9 to be activated and to yield — via not illustrated pneumatic or other means — control pulses which are supplied to a valve 13 by means of the connections 12. A metering valve 19 regulates the flow of water, for which purpose the flow-through cross-section of the valve 19 is set for permitting a desired flow of water per unit of time, either manually or by remote control. The instantaneous flow-through quantity is detected by a flow meter 15. The outlet of the flow meter 15 communicates via a water conduit 16 with the housing 1, or rather in this case with the inlet 5. A distributor tube 17 is provided with a plurality of nozzles 18 and communicates with the conduit 16, extending into the interior of the inlet 5. A guide baffle 20 is mounted in the inlet 5 upwardly of the plate 10 and directly below the inlet pipe 21, so that material which is admitted through the inlet pipe 21 is directed by the guide baffle 20 so as to impinge upon the plate 10.

The rotor mounted within the confines of the wall 2 is provided with a plurality of longitudinally extending circumferentially spaced carriers 31, and these carry a large number of impact blades 30 which project radially. The rotor has two trunions 32 and 33 which extend out of the housing 1 and are rotatably mounted in journals 34 and 35. The journals in turn are mounted on supports 36 which are connected with the housing and with the floor. Motor 37 is directly mounted on one of the supports 36 (the left-hand one in FIG. 1) and has an output shaft on which a pulley 382 is secured which drives via belts or the like 39 another pulley 386 that is fixedly mounted on the trunion 33, so that the rotor will be driven in rotation.

The operation of the apparatus in FIGS. 1–3 will now be described with reference to the wetting of wheat kernels, by way of example.

The wheat kernels are admitted via the inlet pipe 21 in form of a stream which is deflected by the baffle 20 onto the blade 10. This causes the blade 10 to be pivoted downwardly on the arm 11, and via the device 9 the valve 13 is opened. The amount of water to be admitted per unit time has already been selected by setting the valve 19, or is simultaneously so selected, and therefore as soon as the valve 13 is opened, water begins to spray into the falling stream of wheat kernels from the nozzles 18.

The now wet kernels enter into the housing 1 and as soon as they enter the region of the blades on the rotor 3 which turns at high speed, they are accelerated to high speed. Since the wall 2 is of circular outline and has a continuous inner surface, the accelerated wheat kernels form in the region of this inner surface a tubular veil of kernels which whirls or rotates at high speed, that is with almost the same speed as the rotor 3. Due to the large number of blades 30 on the rotor the veil of whirling kernels is guided by these blades. Since the inner surface of the wall 2, which latter is stationary, is smooth, relatively little retarding effect is exerted by contact of the whirling kernels with this inner surface. The individual wheat kernels receive blows from the blades 30 with a high frequency, but do not become damaged because after each impact they can yield freely in radial and/or axial direction. The effect of each impact is determined by the relative speed of blade and kernel as well as the mass of the kernel.

The constantly entering new kernels, that is the ones that are constantly being freshly admitted through the inlet 5, tend to exert a propelling action upon the whirling tubular veil of kernels, so that the veil continuously travels towards the outlet 6. Assuming a constant rate of feed of material via the inlet 5, it will be clear that the dwell time of the kernels in the housing 1 will similarly be constant.

During their travel in the housing 1 the kernels constantly and rapidly shift relative to one another, which results in a maximum mixing of the kernels. Any differential in the degree of wetting of different kernels will be compensated for within only a few revolutions of the kernels in the housing. The circumferencial velocity of the kernels is at least 5m/sec. and may be as high as on the order of 30m/sec. It is assumed that surface portions of the kernels may reach even higher momentary absolute circumferencial velocities, as a result of the fact that the kernels themselves rotate about their own axis as they whirl in rotation in the housing 1. Thus, the water with which the kernels have been contacted is evenly distributed on the entire surface of each kernel in form of tiny droplets or of a film, as a result of the centrifugal forces and the impacts which the kernels receive. This is the reason why a uniform wetting is obtained even in the recesses of certain kernels, such as wheat kernels, that was never before possible in the prior art. Moreover, the impacts upon the kernels contribute very substantially to the intensive wetting effect. On impact, each kernel is slightly deformed and a portion of the water adhering to it is in effect "massaged" into the outer layers of its shell, causing a softening of the outer layers which during the later grinding of the kernels to obtain flour has beneficial effects in terms of the ease of grinding, the sifting and ultimately also has beneficial effects in terms of the baking characteristics of the thus-obtained flour. This is especially true if the kernels admitted at the inlet 5 have previously been only cleaned by the dry-type method, that is if they were not already previously wetted by undergoing a wet-cleaning operation.

Of course, it is clear that the apparatus according to the present invention is by no means limited to the wetting of previously only dry-cleaned kernels. It can be used with equal advantage for the processing of kernels which have previously undergone a wet-cleaning operation. As was pointed out earlier, when kernels are subjected to a wet cleaning operation, they will undergo a certain amount of wetting, but the percentage value of wetting which is obtained in this manner is not controllable, or at least not within the necessary limits, so that a subsequent processing in the apparatus according to the present invention is advisable even for previously wet-cleaned kernels in order to assure that a precise pre-selected degree of wetting is obtained.

A test apparatus was constructed and it was found that even utilizing a short rotor 3 — and therefore affording only a comparatively short travel path for the kernels — it was possible to increase the moisture content of grain kernels by up to 5%. On the other hand, it was also found that even minute quantities of water amounting to only a few tenths of 1% by weight of the grain, can be uniformly and effectively distributed to the grain kernels to uniformly wet the same.

We have found that in certain applications, for example when wetting wheat kernels, the optimum circumferencial velocity for the outer free ends of the blades 30 is on the order of about 20–25m/sec. In all instances, however, a large number of blades 30 is important. Since the whirling veil of kernels travels along the inner surface of the wall 2, along which the outer free ends of the blades 30 also move with slight radial spacing, the number of blades 30 required can be related to the surface area of the inner surface of the wall 2. For example, if it is assumed that the rotor 3 shown in FIG. 1 has an outer diameter of 250–300 millimeters and a length of approximately 1 meter, then approximately 200 blades 30 should be provided on the rotor 3 per square meter of inner surface area of the wall 2.

FIG. 2 shows that the blades 30 are advantageously mounted on a plurality of carriers 40 which are mounted on the rotor 3 by means of screws 41 and extend axially of the rotor. The blades 30 on each rotor are advantageously axially offset with reference to the blades on the circumferentially preceding and the circumferentially succeeding carrier 40. This can be done by axially displacing the carriers 40 relative to one another, as illustrated in FIG. 2. It assures that the blades 30 are not all located in respective radial planes and form between themselves large circumferentially extending gaps, which would be disadvantageous. Instead, the afore-mentioned arrangement provides for even better guidance of the vail of whirling grain kernels with a smaller number of blades 30 than would otherwise be possible.

The inner shaft of the rotor 3 is identified with reference numeral 45; for hygienic as well as economic reasons it is advantageous if the shaft 45 is a hollow shaft. The diameter $D_F$ of the shaft at the base of the blades 30 amounts preferably to approximately 20–50% of the inner diameter of the wall 2. With such a construction the working space in the interior of the housing can be readily cleaned, and under normal operation it is self-cleaning which is of course highly advantageous.

FIG. 3 shows that advantageously the inlet (and the same should be understood to be true for the outlet 6) discharges tangentially of the housing 1. The direction in which the inlet 5 discharges into the housing 1 is in the same sense as the direction of rotation of the rotor 3, which is identified with reference numeral 51 whereas the direction of entry of the grain kernels from the outlet 5 is identified by the arrow 50. This results in a quite gentle acceleration of the incoming grain kernels and prevents damage to them. FIG. 1 shows that the arrangement of the outlet 6 is analogous.

Figure 4:
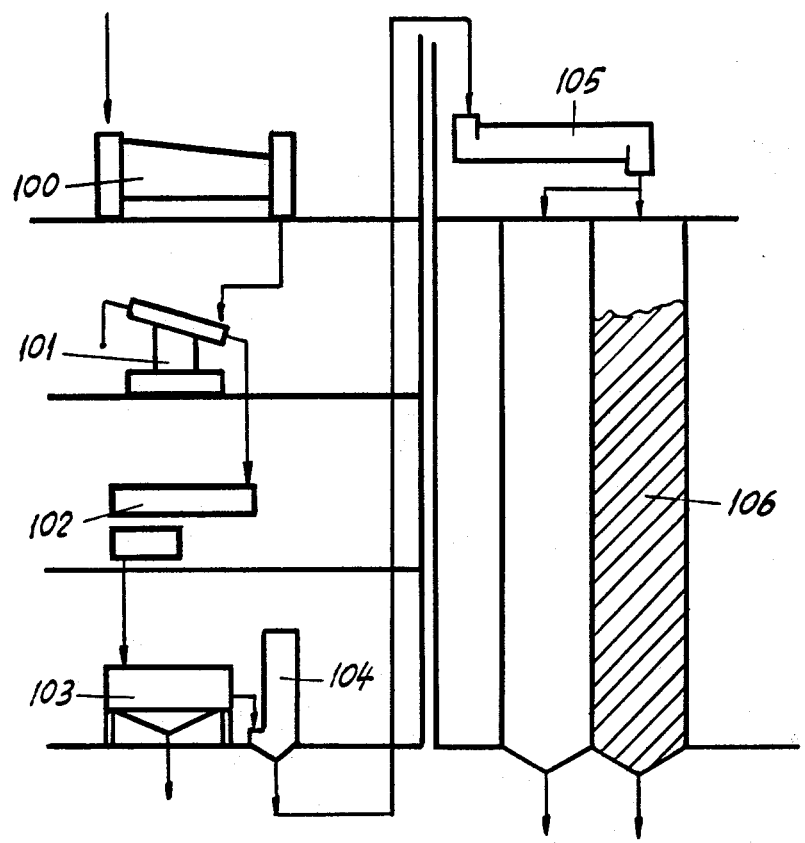
FIG. 4 is a somewhat diagrammatic view, illustrating an example of views of the apparatus of the present invention.

FIG. 4 shows diagrammatically how the apparatus according to the present invention can be utilized.

Reference numeral 100 identifies a grain separator in which the grain is separated from chaff or the like. From there the grain enters into a stone separator 101 where any stones and pebbles contained in the grain are removed. The grain then proceeds to a cokle cylinder 102 and from there travels to a dry-scrubbing machine 103 from which it is forwarded via a grain aspirator 104 into an apparatus 105 according to the present invention, to be discharged finally into a settling or soaking tank 106. The devices 100–104 are all well known in the art and have no bearing upon the present invention. They have been illustrated merely to show the processing which the grain undergoes before it reaches the apparatus 105.

In the apparatus 100 the grain kernels are freed of large contaminants such as straw, chaff, sand, pieces of cording and the like. The apparatus 101 removes all stones and possible other heavy components, whereas the apparatus 102 removes weed seeds and the like. Dirt and loose shells are scrubbed off the grain in the apparatus 103 and dust and possibly still remaining loose shell portions are removed in the aspirator 104.

The now completely cleaned (note that this was a dry-type cleaning operation) grain, for example wheat kernels, enters the apparatus 105 which may be of the type shown in FIGS. 1–3, where water is added to it and where it undergoes wetting before it is discharged from the outlet of the apparatus into the soaking tank 106. After the required soaking period the grain is then admitted into the mill to be converted into flour.

While FIG. 4 illustrates a dry-type cleaning operation preliminary to admission of the grain into the apparatus 105 of the present invention, the apparatus could also receive grain that has previously undergone a wet-type cleaning operation, as already described earlier. In fact, the apparatus according to the present invention can be utilized whenever grain kernels are to be wetted with a precise amount of moisture, and/or where it is desired that the outer layers of the kernel shells be partially softened by the effect of the water that is "massaged" into them in the manner described earlier.

A further embodiment of the novel apparatus is illustrated in FIG. 5. This apparatus has a housing 201, a circumferential wall 202 and a rotor 203. The drive for the rotor 203 is the same as in FIG. 1 and will therefore not be separately described. The inlet for the grain to be processed is identified with reference numeral 204, and the outlet with reference numeral 205. A water distributing pipe 206 is provided with one or more discharge nozzles 207.

The rotor 203 has a hollow shaft 210 and is provided at its opposite axial ends — particularly if it is longer than about 1 meter — with respective trunions 208 and 209 in which it is journalled. In the region of the inlet 204 the rotor carries accelerating blades 201, and over the remainder of its axial length the rotor carries blades 212 which are of circular cross-section and which are offset axially in the manner described with respect to FIG. 2.

The operation of the embodiment in FIG. 5 corresponds essentially to that of FIGS. 1–3. The main difference is that the rotor 203 is provided only in the region of the inlet 204 with the accelerating blades 211 which are approximately the same as the blades 30 of FIGS. 1–3, whereas all the other blades 212 are of circular cross-section and preferably have rounded free ends.

It should be understood that although the blades 211 resemble largely the blades 30 of FIGS. 1–3, they actually have predominantly an accelerating function to assure the desired acceleration of the incoming kernels and to assure the axial movement of the kernels towards the outlet 205. The stream of incoming kernels is accelerated to a very high angular velocity, to form the tubular vail which whirls or sweeps around on the inner surface of the wall 202; due to the large number of individual accelerating blades 211 this is accomplished without causing damage to the individual grain kernels. The water is uniformly distributed to the incoming grain kernels in the inlet 204.

The main consideration behind the differences of the embodiment in FIG. 1 verses that of FIGS. 1-3 is to assure an even more gentle processing of the kernels. With certain types of kernels which are to be subsequently milled, but also with certain types of seeds which are to be processed for later planting, this is absolutely required. To assure this even more gentle treatment of the kernels, the blades 212 are of circular cross-section and the embodiment of FIG. 5 relies less than that of FIGS. 1-3 upon impacting of the kernels by the blades. Instead, the wetting effect in this embodiment results predominantly from the presence of extremely fine water droplets and from the centrifugal forces acting upon the kernels themselves. Due to the reduced impact intensity resulting from the use of the circular cross-section blades 212, the number of blades 212 per square meter of inner surface area of the wall 202 is advantageously greater than in the embodiment of FIG. 1. In fact, it is preferred that this number be not less than 100, and our current determinations indicate that an apparently optimum number would be on the order of 200-400 blades 212 per square meter of inner surface area of the wall 202. The blades 212 have approximately the length of an adult finger and are advantageously again arranged in rows, being offset axially in the manner described with respect to FIG. 2 and as also shown in FIG. 5. Instead of circular cross-section, the blades 212 may also have an otherwise rounded cross-section, for example they may be oval in their cross-section. If they are of other-than-round cross-section, the blades 212 may be so inclined that they tend to effect an advancement of the kernels in the direction towards the outlet 205. In the region of the outlet 205 such blades may be so arranged that they tend to retard the outflow of the kernels through the outlet 205 to some extent. Irrespective of the particular cross-sectional configuration chosen for the blades 212, however, it is important that a large number of them be present for the reasons explained earlier, and that the rotations per minute performed by the rotor 203, assuming for example that the inner diameter of the wall 202 is on the order of approximately 300 millimeters, be about 400-1800 rpm, preferably 900-1200 rpm.

Since the apparatus according to the present invention assures a particularly uniform wetting of the kernels, the wetting effect can be measured immediately downstream of the apparatus and the amount of water admitted for wetting purposes can be appropriately regulated in dependence upon the measured effect. This is of course a highly advantageous possibility. FIG. 5 makes this possible by providing a detecting device 215 which detects the flow of material into the housing 201 and yields signals via a control line 216 to a regulating device 217; it receives electrical energy via a line 218. The device 217 is connected via a line 219 with a valve 220 which when activated yields a control pulse that causes opening or closing of the metering valve 221. The instantaneous flow-through quantity can be read on a flow meter 222. The device 217 is connected with a moisture measuring device 223 via a line 224; the device 223 may be of any well-known type that is commercially available, and may for instance operate on a radiation basis, for example by microwave adsorption. The device 217 may be connected with a control stand (not shown) via a control ine 225 and can be set either via the line 225 or else directly and manually to select a desired value for the degree of wetting in percentage of the weight of grain. The device 217 then automatically maintains this set value; they may be provided with a gauge or indicator 226 which provides a visual indication of the value.

Coming now to FIGS. 6-8 it will be seen that these illustrate another embodiment of the invention. In this embodiment the housing of the apparatus is identified with reference numeral 301 and has a circumferential wall 302 in which a rotor 303 is mounted for rotation. The inlet for the grain to be processed is identified with reference numeral 304, and the outlet with reference numeral 305. The water metering arrangement here uses two separate units, namely a unit 306 and a unit 307, the latter being arranged between the inlet 304 and the outlet 305 and having a valve 310 by means of which the amount of water to be admitted can be regulated.

In this embodiment, also, the rotor 303 is provided with an accelerating screw 308 in the region of the inlet 304. Over the remainder of its axial length the rotor 303 is provided with blades 309 which extend normal or substantially normal to its axis of rotation.

The embodiment of FIGS. 6-8 is particularly suitable for wetting of grains or grain mixtures that need not be treated as gently as has been explained before, that is wherein the kernels are not particularly subject to breakage or abrasion.

In this embodiment the first water admitting unit 306 communicates not with the inlet 304, but with the first end portion of the housing 301 which is located immediately downstream of the inlet 304, that is that portion in which the incoming stream of grain kernels is being accelerated to form the whirling tubular vail. The second unit 307 communicates still farther downstream with the housing 301, and depending upon the type of grain to be treated the second unit may for instance communicate with the first third (measured from the inlet 304) of the housing, or at the center of the housing. Of course, other locations are also possible. The use of the second unit 307 improves the uniformity of water distribution and of wetting of the grain, and if desired the water admitted via the unit 307 may have additives included in it, for example if seed grains (for planting) are to be processed which might require to have fungacides or some other substance added to them. The first unit 306 could then admit pure water. Evidently, a reversal of this arrangement would also be possible, with the second unit 307 admitting pure water and the first unit 306 admitting water having an additive included in it. It is known that additives can be more uniformly distributed to and on the individual kernels if the kernels are already wetted. We wish it to be understood that the possibility of using two (or perhaps even more) separate wetting units, that is wetting units which admit water at different locations of the apparatus, can also be utilized in all other embodiments disclosed herein, not only in the embodiment of FIGS. 6-8.

FIG. 9 illustrates only a different embodiment of a rotor; this rotor can be used with any of the apparatus embodiments disclosed herein, in lieu of the rotors shown in the particular embodiments. The rotor in FIG. 9 is identified with reference numeral 401 and it is provided with blades 402 which are so mounted as to effect axial advancement of the grains in the direction towards the outlet, and which alternate with blades 403 that extend normal to the axis of rotation. In other words, the blades 402 are inclined and the blades 403 are not, as clearly visible in FIG. 9. The inlet for the grains to be treated is identified by the arrow 404. Individual ones of the blades 402 or perhaps even 403 might be so arranged that they exert a retarding effect upon the movement of the grain towards the right in FIG. 9, that is towards the outlet.

FIG. 10, finally, shows another embodiment of a rotor, identified with reference numeral 501, that can also be in lieu of the rotors described in the various apparatus embodiments disclosed herein. The rotor 501 is mounted in a housing (not shown) in the same manner as described with reference to the apparatus embodiment. The inlet for the grain to be treated is identified diagrammatically by the arrow 502. In the region of this inlet the rotor 501 has a reduced outer diameter, corresponding to that of a rotor shaft 503 which merges with the tubular portion of the rotor via a conical connecting portion 504. The portions 503 and 504 are surrounded by an accelerating screw 505 having the illustrated helical configuration and being formed of an appropriate strip of material that is mounted on the rotor 501 to turn with the same. There is a relatively large free space between the screw 505 and the surface of the rotor shaft 503. In this embodiment, the blades are identified with reference numeral 506 and are of substantially teardrop-shaped cross-section as is evident from FIG. 10; they are also inclined transversely of the axis of rotation, as the drawing clearly shows, in order to effect advancement of the grain axially of the rotor towards the outlet, that is towards the right in FIG. 10. The rotor of FIG. 10 assures a gentle acceleration of the incoming grain kernels, and a gentle advancement of the grain kernels through the apparatus towards the outlet, since the helical configuration of the screw 505 which serves to accelerate the incoming grain, and the teardrop-shaped cross-section of the blades 506 produce a gentle contact with the incoming grain kernels, thus avoiding damage to them.

We wish it to be understood that various modifications may be made and will offer themselves to those skilled in the art, but will not constitute a departure from the central inventive concept of this invention. In all embodiments it is clear that the material inlet for the grain, and the material outlet therefore, could be different from what has been illustrated. They could, for example, be radial instead of tangential, or the like. The blades in all embodiments could also be different from those illustrated; they might, for example, have a curved configuration which in certain special applications could bring advantages.

It will be understood that each of the elements described above, or two or more together, may also find a useful application in other types of constructions differing from the types described above.

While the invention has been illustrated and described as embodied in an apparatus for moistening whole grains, it is not intended to be limited to the details shown, since various modifications and structural changes may be made without departing in any way from the spirit of the present invention.

Without further analysis, the foregoing will so fully reveal the gist of the present invention that others can by applying current knowledge readily adapt it for various applications without omitting features that, from the standpoint of prior art, fairly constitute essential characteristics of the generic or specific aspects of this invention.

What is claimed as new and desired to be protected by Letters Patent is set forth in the appended claims.

1. A method of uniformly moistening whole grain kernels to a predetermined uniform moisture content in preparation for milling, comprising the steps of:
   a. admitting whole grain kernels through an inlet at one end of a closed, circular vessel having an inner circumferential wall;
   b. admitting metered quantities of water into contact with said grain kernels in the region of said vessel inlet;
   c. accelerating the admitted grain kernels circumferentially within the vessel and creating a whirling tubular veil of generally freely moving grain kernels in the vicinity of the inner circumferential wall of the vessel that moves substantially continuously lengthwise of the vessel, through the use of a rotor that extends axially within the vessel, the rotor having a plurality of individual blades projecting transversely of the rotor axis and having free outer ends, said blades being spaced over substantially the entire length of the rotor and generally uniformly spaced around its circumference, the blades numbering at least twenty blades for every square meter of surface area of said inner circumferential wall, and the rotor being made to rotate at a speed requisite for imparting to the outer ends of the blades a circumferential velocity of between substantially six meters per second and thirty meters per second, whereby said whole grain kernels are impacted within the whirling tubular veil by the rotating blades and caused to frictionally engage each other, thereby effecting uniform moistening of the grain kernels;
   d. and removing and uniformly moistened whole grain kernels through an outlet at the other end of the vessel.

2. The method defined by claim 1, wherein water is metered to the admitted grain kernels in an amount of about 0.1-5% by weight of the kernels.

3. The method defined by claim 1, wherein the admitted water takes the form of steam.

4. The method defined by claim 1, wherein the moisture content of the grain kernels is determined prior to admission to the vessel, and water is metered to the grain kernels as a function of said moisture content.

5. The method defined by claim 1, wherein the moisture content of the grain kernels is determined after leaving the vessel, and water is metered to the grain kernels as a function of said moisture content.

6. The method defined by claim 1, wherein the vessel diameter is about 250-600 mm.

7. The method defined by claim 1, wherein the vessel diameter is about 300 mm.

8. The method defined by claim 7, wherein the vessel length is about 2 m.

9. The method defined by claim 1, wherein the rotor is rotated at a speed requisite for imparting to the other ends of the blades a circumferential velocity of between substantially 20 m. per second and 25 m. per second.

10. The method defined by claim 1, wherein the inner circumferential wall of the vessel is smooth and impermeable.

11. The method defined by claim 1, wherein the vessel inlet and outlet are tangentially oriented relative to the circumferential wall and arranged to receive and discharge grain kernels in the direction in which the rotor rotates.

12. The method defined by claim 1, wherein the axis of the rotor and vessel is inclined relative to horizontal, with the inlet end higher than the outlet end.

13. The method defined by claim 1, wherein the rate of admitting grain kernels to the vessel is substantially constant, and the dwell time of the kernels in the housing is substantially constant.

* * * * *

UNITED STATES PATENT AND TRADEMARK OFFICE
CERTIFICATE OF CORRECTION

PATENT NO. : 4,055,673
DATED : Oct. 25, 1977
INVENTOR(S) : Roman Mueller et al.

It is certified that error appears in the above-identified patent and that said Letters Patent are hereby corrected as shown below:

Column 2, line 16, the word "types" should be --type--.

Column 2, line 27, the word "non" should be --not--.

Column 2, line 56, the word "orther" should be --other--.

Column 2, line 57, the word "kernal" should be --kernel--.

Column 3, line 9, the word "term" should be --germ--.

Column 3, line 51, the word "as" should be --at--.

Column 3, line 63, the words "dye-type" should be --dry-type--.

Column 5, line 37, the word "weil," should be --veil,--.

Column 6, line 3, the word "is", second occurrence, should be --in--.

Column 7, line 1, the words "art overcome" should be --art are overcome--.

UNITED STATES PATENT AND TRADEMARK OFFICE
CERTIFICATE OF CORRECTION

PATENT NO. : 4,055,673

DATED : Oct. 25, 1977

INVENTOR(S) : Roman Mueller et al.

It is certified that error appears in the above-identified patent and that said Letters Patent are hereby corrected as shown below:

Column 7, line 12, the words "an circumferencial" should be --a circumferential--.

Column 7, line 28, the words "an circumferencial" should be --a circumferential--.

Column 7, line 30, the word "circumferencial" should be --circumferential--.

Column 7, line 51, the word "circumferencial" should be --circumferential--.

Column 7, line 55, the words "high speed" should be changed to --high circumferential speed--.

Column 8, line 9, the word "circumferencial" should be --circumferential--.

Column 8, lines 11 and 12, the word "circumferencial" should be --circumferential--.

Column 8, line 43, the word "vail" should be --veil--.

UNITED STATES PATENT AND TRADEMARK OFFICE
CERTIFICATE OF CORRECTION

PATENT NO. : 4,055,673
DATED : Oct. 25, 1977
INVENTOR(S) : Roman Mueller et al.

It is certified that error appears in the above-identified patent and that said Letters Patent are hereby corrected as shown below:

Column 9, line 27, the word "walls" should be --wall--.

Column 11, line 47, the number "382" should be --38a--.

Column 11, line 48, the number "386" should be --38b--.

Column 12, line 28, the word "circumferencial" should be --circumferential--.

Column 12, line 32, the word "circumferencial" should be --circumferential--.

Column 13, lines 13 and 14, the word "circumferencial" should be --circumferential--.

UNITED STATES PATENT AND TRADEMARK OFFICE
CERTIFICATE OF CORRECTION

PATENT NO. : 4,055,673

DATED : Oct. 25, 1977

INVENTOR(S) : Roman Mueller et al.

It is certified that error appears in the above-identified patent and that said Letters Patent are hereby corrected as shown below:

Column 13, line 40, the word "vail" should be --veil--.

Column 15, line 2, the word "vail" should be --veil--.

Column 16, line 39, the word "vail" should be --veil--.

*Signed and Sealed this*

*Twenty-first* Day of *March 1978*

[SEAL]

Attest:

RUTH C. MASON
*Attesting Officer*

LUTRELLE F. PARKER
*Acting Commissioner of Patents and Trademarks*